3,491,128
PROCESS FOR MAKING DIPHENOQUINONES
Brian B. Dewhurst, Detroit, Mich., assignor to Ethyl
 Corporation, New York, N.Y., a corporation of Virginia
No Drawing. Filed June 29, 1966, Ser. No. 561,380
Int. Cl. C07c 49/62
U.S. Cl. 260—396                                    4 Claims

ABSTRACT OF THE DISCLOSURE

Phenols having at least one unsubstituted ortho or para position (e.g., 2,6-di-tert-butylphenol) are converted to diphenoquinones by reaction with a sulfur chloride (e.g., sulfur dichloride) in the presence of dimethylformamide. The diphenoquinones are readily reduced to the corresponding bisphenols, which are useful antioxidants.

---

This invention relates to a process for making diphenoquinones. In particular, this invention relates to a process for preparing diphenoquinones by the reaction of a phenol with sulfur dichloride in the presence of dimethylformamide.

Diphenoquinones are readily reduced to bisphenols. Bisphenols are especially useful as antioxidants for materials normally undergoing deterioration in the presence of oxygen. For example, 4,4'-bis(2,6-di-tert-butylphenyl) is an excellent antioxidant in such materials as hydrocarbon lubricating oils, gasoline, polyolefins such as polyethylene and polypropylene, and both natural and synthetic rubbers such as SB–R rubber, EPT rubber, poly cis butadiene, isoprene, and the like.

An object of this invention is to provide a process for making diphenoquinones. A further object is to provide a process for preparing diphenoquinones using inexpensive reactants. A still further object is to provide a process for making 3,3',5,5'-tetrahydrocarbyl diphenoquinones. A particular object is to provide a process for producing 3,3', 5,5'-tetra-tert-butyl-diphenoquinone.

These and other objects are accomplished by providing a process comprising reacting a phenol having at least one unsubstituted position ortho or para to the phenolic hydroxyl radical with at least 0.5 mole equivalents of sulfur monochloride or sulfur dichloride in the presence of dimethylformamide.

In a preferred embodiment the phenol reactant has the formula:

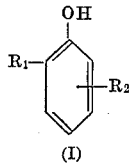

(I)

wherein $R_1$ is selected from the class consisting of alpha-branched alkyl groups containing from 3–20 carbon atoms, alpha-branched aralkyl groups containing from 8–20 carbon atoms, cycloalkyl groups containing from 6–20 carbon atoms, and aryl groups containing from 6–20 carbon atoms, and $R_2$ is selected from the class consisting of alkyl groups containing 1–20 carbon atoms, aralkyl groups containing 7–20 carbon atoms, cycloalkyl groups containing 6–20 carbon atoms, and aryl groups containing 6–20 carbon atoms.

In a more preferred embodiment the $R_2$ substituent in Formula I is located in the position ortho to the phenolic hydroxyl radical.

In a still more preferred embodiment $R_2$ is ortho to the hydroxyl radical and both $R_1$ and $R_2$ are independently selected from the group consisting of alpha-branched alkyl radicals containing from 3–20 carbon atoms, alpha-branched aralkyl radicals containing from 8–20 carbon atoms, cycloalkyl radicals containing from 6–20 carbon atoms, and aryl radicals containing from 6–20 carbon atoms.

The most preferred phenol reactant is 2,6-di-tert-butylphenol.

The process is carried out by bringing the sulfur chloride reactant into contact with the phenol reactant, allowing the reaction to occur and, when desired, recovering the diphenoquinone product.

The phenol reactant must have at least one unsubstituted position ortho or para to the phenolic hydroxyl radical. Some examples of such phenols are: 2-methyl-4-tert-butylphenol, 2,4-dichlorophenol, 2-tert-butyl-4-chlorophenol, 2-bromo - 6 - tert-butylphenol, 2-tert-butyl-4-phenylphenol, 0-octadecylphenol, 2 - tert-octyl-4-nitrophenol, α-naphthol, 2-tert-cetyl-5-methylphenol, 2-tert-butyl-5-methylphenol, and the like.

More preferred phenols are the mononuclear phenols of Formula I wherein $R_1$ is selected from the group consisting of alpha-branched alkyl radicals containing 3–20 carbon atoms, alpha-branched aralkyl radicals containing 8–20 carbon atoms, cycloalkyl radicals containing 6–20 carbon atoms and aryl radicals containing 6–20 carbon atoms, and $R_2$ is selected from the group consisting of alkyl radicals containing 1–20 carbon atoms, aralkyl groups containing 7–20 carbon atoms, cycloalkyl groups containing 6–20 carbon atoms, and aryl groups containing 6–20 carbon atoms. Some examples of these phenols are: 2-tert-butyl-4-methylphenol, 2-isopropyl-4-methylphenol, 2-cyclohexyl-5-methylphenol, 2(α-methylbenzyl)-6-methylphenol, 2 - phenyl-6-tert-butylphenol, 2(4-ethylcyclohexyl)-4-sec-amylphenol, 2-tert-eicosyl-5-ethylphenol, 2-sec-butyl-6-methylphenol, and the like.

In a still more preferred embodiment the phenolic reactant represented by Formula I has both $R_1$ and $R_2$ substituents located in the position ortho to the phenolic hydroxyl radical. Some examples of these phenols are: 2 - methyl-6-tert-butylphenol, 2-cyclohexyl-6-ethylphenol, 2-phenyl - 6 - tert-butylphenol, 2-methyl-6-tert-eicosylphenol, and the like.

In a highly preferred embodiment both $R_1$ and $R_2$ in Formula I are located ortho to the phenolic hydroxyl radical and are both independently selected from the group consisting of alpha-branched alkyl radicals containing 3–20 carbon atoms, alpha-branched aralkyl radicals containing 8–20 carbon atoms, cycloalkyl radicals containing 6–20 carbon atoms and aryl radicals containing 6–20 carbon atoms. Some examples of these phenols are: 2,6-diisopropylphenol, 2-tert-butyl - 6 - cyclohexylphenol, 2,6 - di-tert-butylphenol, 2-tert-butyl-6-(α,α-dimethylbenzyl)phenol, 2,6-di(α-methylbenzyl)-phenol, 2, 6-di-sec-butylphenol, 2-isopropyl-6-tert-octylphenol, 2,6-di-tert-eicosylphenol, and the like.

The most preferred phenol reactant is 2,6-di-tert-butylphenol.

Useful sulfur chloride reactants are sulfur monochloride ($S_2Cl_2$) and sulfur dichloride ($SCl_2$). Of these, sulfur dichloride is preferred.

The amount of sulfur chloride reactant used can vary over a wide range. It is preferred that there be in excess of 0.5 moles of the sulfur chloride reactant per mole of the phenol reactant. A useful range is from about 0.5 to 10 moles of sulfur chloride reactant per mole of phenol reactant. A more preferred range is from about 1–5 moles of sulfur chloride reactant per mole of the phenol, and a most preferred range is from 1–2 moles of the sulfur chloride reactant per mole of the phenol reactant.

The reaction is conducted in the presence of dimethylformamide. A preferred amount of dimethylformamide is from 0.1 to 10 parts by weight per part of phenolic starting material. A more preferred concentration of dimethylformamide is from 0.5 to 5 parts per part of the phenol reactant, and a most preferred range is from 0.75 to 1.5 parts of dimethylformamide per part of phenol reactant.

Additional solvent can be employed if desired, although it is usually not necessary. If used, the preferred additional solvents are hydrocarbon solvents such as toluene, xylene, kerosene, and the like. The more preferred solvents are the aliphatic hydrocarbon solvents such as hexane, octane, and the like.

The temperature during the process should be high enough that the reaction proceeds at a good rate, but not so high as to cause degradation of the product or diminution in yield caused by side reactions. A useful temperature range is from about 0 to 200° C. A more preferred temperature range is from about 0 to about 100° C., and a most preferred range is from about 10 to 50° C.

The process should be conducted for a period of time sufficient to obtain optimum yields. The reaction is generally complete in from about 30 minutes to 30 hours. A more useful time range is from about one-half hour to 4 hours, and a most preferred range is from one-half hour to one hour.

The following examples will illustrate the present invention. All parts are parts by weight unless otherwise indicated.

EXAMPLE 1

To a reaction vessel equipped with stirrer, thermometer and cooling means was added 62 parts of 2,6-di-tert-butylphenol and 48.5 parts of dimethylformamide. This mixture was stirred and cooled to 10° C. Over a period of 200 minutes, 47.5 parts of sulfur dichloride was added. An exothermic reaction occurred. The temperature was maintained at 15° C. by cooling. A red crystalline product formed which was removed by filtration and identified by infrared analysis as 3,3',5,5'-tetra-tert-butyl-diphenoquinone. The product was obtained in 70 percent yield.

EXAMPLE 2

To a reaction vessel equipped as in Example 1 is added 206 parts of 2,6-di-sec-butylphenol and 206 parts of dimethylformamide. Over a period of one hour, 52 parts of sulfur dichloride are added. The temperature is allowed to rise and is maintained at 100° C. for 30 minutes following the sulfur dichloride addition. It is then cooled, yielding 3,3',5,5'-tetra-sec-butyl-diphenoquinone.

Good results are obtained in the above example using sulfur monochloride instead of sulfur dichloride. Likewise, equal molar amounts of the phenols previously described can be employed.

EXAMPLE 3

To a reaction vessel equipped as in Example 1 is added 302 parts of 2,6-di(α-methylbenzylphenol, 30.2 parts of dimethylformamide and 500 parts of hexane. Over a period of 2 hours, 270 parts of sulfur monochloride are added, while maintaining the temperature at 50° C. The mixture is stirred for one additional hour at 50° C. and then cooled to 10° C. The product, 3,3',5,5'-tetra-(α-methylbenzyl)diphenoquinone is recovered in good yield.

Other phenols such as 2,6-diisopropylphenol, o-tart-butyl-phenol, 2,6 - dicyclohexylphenol, 2,6 - di-tert-butylphenol, and the like, can be employed in the above example giving the corresponding diphenoquinone.

Another embodiment of this invention is a process for making 4,4'-bis(2,6-dihydrocarbyl phenols) by reacting a 2,6-dihydrocarbyl phenol with a sulfur chloride in the presence of dimethylformamide and then reducing the 3,3',5,5'-tetra-hydrocarbyl - diphenoquinone formed to 4,4'-bis(2,6-dihydrocarbylphenol. For example, 4,4' - bis (2,6-di-tert-butylphenol) is prepared by reacting 2,6-di-tert-butylphenol with sulfur dichloride in the presence of dimethylformamide to produce 3,3',5,5'-tetra-tert-butyl-diphenoquinone and then reducing this material to 4,4'-bis(2,6-di-tert-butylphenol).

The reducing means employed may be any of those well known in the art. For example, the reduction step may be carried out by chemical reducing means. Thus, a metal in combination with an acid can be used to effect the desired reduction. Metals that will react with acids to form hydrogens are employed. Typical metals of this type are zinc, iron, magnesium, aluminum, calcium, manganese, cadmium, and the like. The most preferred metals are zinc and iron.

The acids that can be used in the reduction step have sufficient acidity to react with the metal employed. Preferred acids are the mineral acids such as hydrochloric, sulfuric, orthophosphoric, and the like. The most preferred acid is hydrochloric acid.

Other chemical reducing means may be employed in this process. Thus, sodium aluminum hydride, sodium hybride, sodium borohydride, and the like, can be employed, using methods well known in the art.

An especially preferred reducing means is catalytic hydrogenation. In this embodiment, the diphenoquinone is usually dissolved in an inert solvent and contacted with hydrogen and a hydrogenation catalyst. Suitable solvents are those solvents which will dissolve some of the diphenoquinone, but are substatnially inert under the reaction conditions. Some examples are alcohols such as methanol, ethanol, isopropanol, and the like; ethers such as diethyl ether, diethyleneglycol dimethyl ether, ethyleneglycol diethyl ether, and the like; ether alcohols such as ethyleneglycol monoethyl ether, diethyleneglycol monomethyl ether, and the like; aromatic hydrocarbons such as benzene, toluene, xylene, and mixtures thereof; and aliphatic hydrocarbons such as pentane, hexanes, heptanes, octaines, nonanes, and aliphatic hydrocarbon mixtures.

Suitable hydrogenation catalysts are those commonly used to catalyze the hydrogenation of organic compounds. Some examples of these include palladium chloride on charcoal, activated nickel, nickel-nickel oxide, platinum-platinum oxide, platinum on charcoal, copper chromite Raney nickel, palladium, platinum black, palladium sponge, nickel, copper impregnated alumina, palladium black, activated alumina, Raney copper, chromium, vanadium molybdenum, and the like. The more preferred catalysts are platinum, palladium, Raney nickel, copper impregnated alumina and copper chromite. The most preferred catalyst is Raney nickel.

The catalytic hydrogenation may be carried out at atmospheric presure or at elevated pressures. Higher pressures result in faster hydrogenation rates. Extremely high pressures are not required. A preferred hydrogenation pressure range is from atmospheric pressure to about 1000 p.s.i.g. A more preferred pressure range is from about 10 to 500 p.s.i.g., and a most preferred hydrogenation pressure range is from about 15 to about 100 p.s.i.g.

The hydrogenation is carried out at a temperature high enough to promote the reduction, but not so high as to cause degradation of the reactants, reaction medium or products. A preferred temperature range is from about 25 to 150° C. A more preferred temperature range is from about 40 to 100° C., and a most preferred temperature range is from about 60 to about 80° C.

The time required to convert the various diphenoquinones to bisphenols will vary according to the reduction conditions. Higher temperatures will promote faster reductions. Furthermore, higher pressures afford faster reduction rates. In general, the reduction is complete in less than 8 hours. A more preferred reduction time is about 0.5 to 4 hours, and a most preferred time is from about 0.5 to one hour.

The following examples serve to illustrate the chemical and catalytic reduction of a diphenoquinone.

EXAMPLE 4

In a reaction vessel equipped with stirrer, reflux condenser and thermometer is placed 20.4 parts of the 3,3',5,5'-tetra-tert-butyl-diphenoquinone prepared in Example 1. Five hundred parts of isopropanol are added. The mixture is stirred and heated to 60° C., at which point 20 parts of 37 percent aqueous hydrochloric acid is added. Following this, 8 parts of zinc powder are added slowly over a one hour period at 60° C. Following this, the reaction is cooled to 50° C. and the insoluble material removed by filtration. The filtrate is cooled and the product, 4,4'-bis(2,6-di-tert-butylphenol), is recovered.

EXAMPLE 5

To a pressure reaction vessel equipped with stirring means, temperature measuring means and gas inlet means is added 20.4 parts of 3,3',5,5'-tetra-tert-butyl-diphenoquinone, 150 parts of ethanol and 1.5 parts Raney nickel. The vessel is sealed and flushed with nitrogen. The vessel contents are then heated to 76° C. and the vessel pressure raised to 50 p.s.i.g. with hydrogen. While maintaining these conditions, the vessel is agitated for one hour. The vessel is then vented and, while still warm, the vessel contents are filtered to remove the catalyst. The filtrate is cooled to 10° C. and yields 4,4'-bis(2,6-di-tert-butylphenol).

Another means of reducing the diphenoquinone to a bisphenol is to heat it in a mixture with the original phenol. The phenol is partially oxidized and the diphenoquinone is reduced to a bisphenol.

Suitable catalysts are acids, amines, and alkali metal hydroxides or alkoxides. The quantity of catalyst should be sufficient to catalyze the reaction at a reasonable rate. A useful range is from about 0.2 to 2 moles of the catalyst per mole of the phenol. A more preferred range is from 0.5 to one mole of catalyst per mole of the phenol.

The reaction can be carried out at any temperature at which it proceeds at a reasonable rate, but below the temperature at which the reactants or products suffer thermal degradation. A preferred range is from about 100 to 350° C. A more preferred range is from about 200 to 300° C., and a most preferred range is from about 225 to 275° C.

The stoichiometry of the reaction requires two moles of the starting phenol per mole of the diphenoquinone. In practice, from about 1.75 to 3 moles of a phenol is employed per mole of diphenoquinone. A more preferred range is from about 1.9 to 2.5, and a most preferred range is from about 2 to 2.1 moles of the phenol per mole of the diphenoquinone.

The process can be conducted with or without a solvent. When a solvent is employed it should be substantially inert to the reactants and products. Use of a solvent is preferred because it makes recovery of the product easier. Preferred solvents are hydrocarbons such as isooctane, kerosene, and the like. Most preferred solvents are the aromatic hydrocarbons such as benzene, toluene, mesitylene, xylene, and the like. A highly preferred solvent is xylene.

The process is normally conducted at atmospheric pressure, although when solvents are employed the reaction should be conducted under whatever vapor pressure is exerted in a closed vessel at the reaction temperature in order to avoid solvent loss.

The process should be carried out for a time sufficient to optimize the yield. The length of time for optimum yield will depend to some extent on the reaction temperature. Good results are usually obtained in from about 15 minutes to 4 hours. A more preferred reaction time is from about 30 minutes to one hour.

The bisphenol products can be recovered by means well known in the art. For example, when the reaction is conducted in a solvent, the solvent can be merely cooled and, in most cases, the bisphenol will precipitate. If the product does not precipitate, the solvent can be removed by distillation, leaving a mixture containing predominantly the bisphenol product. If a purified form is desired, this may be accomplished by recrystallization of the mixture from suitable solvents such as alcohols, ethers, and the like.

The following example illustrates this embodiment of the invention.

EXAMPLE 6

The first step in the process was conducted as in Example 1, forming 3,3',5,5' - tetra - tert - butyl - diphenoquinone. Following this, 90.6 parts of 2,6-di-tert-butylphenol, 81.6 parts of the 3,3',5,5' - tetra - tert - butyl-diphenoquinone and 29 parts of 85 percent potassium hydroxide are placed in a pressure reaction vessel equipped with stirrer, temperature measuring means and heating means. The vessel was flushed with nitrogen and sealed. It was heated to 250° C. while stirring, and kept at this temperature for 30 minutes. The vessel was then cooled and opened. The contents were removed and dissolved in diethyl ether. The ether solution was washed with water and with dilute hydrochloric acid. The ether was evaporated, leaving a residue which was recrystallized from denatured alcohol, giving 137.3 parts of 4,4'-bis(2,6-di-tert-butylphenol).

Similar results are obtained using equal mole amounts of other diphenoquinones and phenols. Likewise, other catalysts may be employed such as amines, acids, amides, or alkali metal alkoxides.

As stated previously, the bisphenols made from diphenoquinones are useful antioxidants. Their usefulness has been demonstrated in Polyveriform Tests. In these tests, 100 ml. samples of neutral oil containing 0.05 percent iron, as ferric-2-ethylhexoate, and 0.1 percent lead bromide were prepared. To these was added one weight percent of 4,4' - bis(2,6 - di - tert - butylphenol) and the samples heated to 300° F. Air was passed through the heated samples at a rate of 48 liters per hour over a period of 20 hours. After this, the viscosity index and the acid number of the oil samples were determined. The viscosity had increased only 66 percent and the acid number was only 3.7, showing that the oil had been effectively stabilized. Even better stabilization is obtained when 4,4'-bis(2,6-di-tert-butylphenol) is added to rubber. Tests have been carried out showing this compound to be superior to many present day commercial antioxidants.

I claim:
1. A process for making diphenoquinones comprising reacting a phenol, said phenol having at least one unsubstituted ortho or para position, with in excess of 0.5 mole equivalents of a sulfur chloride having the formula: $S_nCl_2$, wherein $n$ is an integer from 1–2, in the presence of dimethylformamide.

2. The process of claim 1 wherein said phenol has the formula:

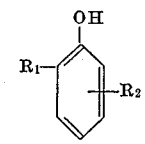

wherein $R_1$ is selected from the class consisting of alpha-branched alkyl groups containing from 3–20 carbon atoms, alpha-branched aralkyl groups containing from 8–20 carbon atoms, cycloalkyl groups containing from 6–20 carbon atoms, and aryl groups containing from 6–20 carbon atoms, and $R_2$ is selected from the class consisting of alkyl groups containing 1–20 carbon atoms, aralkyl groups containing 7–20 carbon atoms, cycloalkyl groups containing 6–20 carbon atoms, and aryl groups containing 6–20 carbon atoms.

3. The process of claim 2 wherein $R_2$ in said formula is located in the position ortho to the phenolic hydroxyl radical.

4. The process of claim 3 wherein said phenol is 2,6-di-tert-butylphenol and wherein said sulfur chloride is sulfur dichloride.

References Cited

UNITED STATES PATENTS 2,686,814   8/1954   Jones _____ 260—601

LORRAINE A. WEINBERGER, Primary Examiner

L. ARNOLD THAXTON, Assistant Examiner

U.S. Cl. X.R.

260—620

PO-1050
(5/69)

UNITED STATES PATENT OFFICE
CERTIFICATE OF CORRECTION

Patent No. 3,491,128      Dated January 20, 1970

Inventor(s) Brian B. Dewhurst

It is certified that error appears in the above-identified patent and that said Letters Patent are hereby corrected as shown below:

Column 1, line 27, "4,4'-bis(2,6-di-<u>tert</u>-butylphenyl)" should read -- 4,4'-bis(2,6-di-<u>tert</u>-butylphenol) -- .

SIGNED AND
SEALED
JUL 21 1970

(SEAL)
Attest:

Edward M. Fletcher, Jr.
Attesting Officer

WILLIAM E. SCHUYLER, JR.
Commissioner of Patents